(12) United States Patent
Whisnant et al.

(10) Patent No.: US 8,738,350 B2
(45) Date of Patent: May 27, 2014

(54) MIXED CONCURRENT AND SERIAL LOGIC SIMULATION OF HARDWARE DESIGNS

(75) Inventors: Keith Whisnant, San Diego, CA (US); Claudio Basile, Oakland, CA (US); Giacinto Paolo Saggese, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 205 days.

(21) Appl. No.: 13/031,139

(22) Filed: Feb. 18, 2011

(65) Prior Publication Data

US 2011/0218792 A1   Sep. 8, 2011

Related U.S. Application Data

(60) Provisional application No. 61/339,391, filed on Mar. 4, 2010.

(51) Int. Cl.
*G06F 17/50*   (2006.01)
*G06G 7/62*    (2006.01)

(52) U.S. Cl.
USPC .................. 703/16; 703/13; 703/14; 703/15; 703/17

(58) Field of Classification Search
USPC ........................ 703/13–19; 364/488
See application file for complete search history.

(56) References Cited

U.S. PATENT DOCUMENTS

| | | | |
|---|---|---|---|
| 6,263,303 B1 * | 7/2001 | Yu et al. | 703/19 |
| 6,466,898 B1 | 10/2002 | Chan | |
| 6,584,436 B2 * | 6/2003 | Hellestrand et al. | 703/13 |
| 7,085,702 B1 * | 8/2006 | Hwang et al. | 703/15 |
| 7,260,517 B2 * | 8/2007 | Bailey et al. | 703/27 |
| 7,401,015 B1 | 7/2008 | Bailey et al. | |
| 2005/0138515 A1 | 6/2005 | Hyduke et al. | |
| 2005/0228629 A1 * | 10/2005 | Dalton | 703/16 |
| 2005/0234692 A1 * | 10/2005 | Reblewski | 703/13 |
| 2008/0215304 A1 * | 9/2008 | Bailey et al. | 703/14 |
| 2009/0164198 A1 * | 6/2009 | Tan et al. | 703/16 |
| 2009/0276738 A1 * | 11/2009 | Jain et al. | 716/5 |
| 2011/0072403 A1 * | 3/2011 | Basile et al. | 716/106 |

FOREIGN PATENT DOCUMENTS

WO    01-35283 A2    5/2001

OTHER PUBLICATIONS

"Parallel Discrete-Event Simulation," Jason Liu, School of Computing and Information Sciences, Florida International University, Feb. 9, 2009.*

(Continued)

*Primary Examiner* — Matt Kim
*Assistant Examiner* — Maryam Ipakchi
(74) *Attorney, Agent, or Firm* — Bever, Hoffman & Harms, LLP; Jeanette S. Harms

(57) ABSTRACT

A method of simulating a design described in HDL is provided. In this method, modules of the design can be partitioned into first modules for simulation by a serial simulation engine and second modules for simulation by a concurrent simulation engine. The first and second modules can be prioritized for simulation based on classes of events consistent with an execution model of the HDL. Simulations of the serial and concurrent simulation engines can be synchronized for each class of events. Synchronizing can include transferring updated interface variable values, which are shared by the second modules and at least a subset of the first modules, between the serial simulation engine and the concurrent simulation engine. This transferring can include translating representations of the updated interface variable values.

48 Claims, 11 Drawing Sheets

(56) References Cited

OTHER PUBLICATIONS

"A Parallel Evolutionary Algorithm for Circuit Partitioning," R. Banos, C. Gil, M.G. Montoya, J. Ortega, Proceedings of the 11th Euromicro Conference on Parallel, Distributed and Network Based Processing, IEEE (2003).*

Todesco, A. R. W. et al., "Symphony: A Simulation Backplane for Parallel Mixed-Mode Co-Simulation of VLSI Systems," 1996 ACM 33rd Design Automation Conference, New York, 6 pages.

* cited by examiner

```
module top_module;          300 reg clk;
    reg [7:0] input1;
    reg [7:0] input2;
    wire [7:0] sum;

adder_module adder (.clk(clk),
                        .a(input1),
                        .b(input2),
                        .out(sum));;

end module module adder (clk, a, b, out),
    input clk;
    input [7:0] a;
    input [7:0] b;
    output [7:0] out;

always @ (posedge clk)
        out = a + b end
```

FIG. 3A
Prior Art

```
module top_module;          310 reg clk;
    reg [7:0] input1;
    reg [7:0] input2;
    wire [7:0] sum;

adder_module adder (.clk(clk),
                        .a(input1),
                        .b(input2),
                        .out(sum));;

end module module adder (clk, a, b, out),
    input clk;
    input [7:0] a;
    input [7:0] b;
    output [7:0] out;

end
```

FIG. 3B

MIXED CONCURRENT AND SERIAL LOGIC SIMULATION OF HARDWARE DESIGNS

RELATED APPLICATIONS

This application claims priority from U.S. Provisional Patent Application 61/339,391, entitled "MIXED CONCURRENT AND SERIAL LOGIC SIMULATION OF HARDWARE DESIGNS WITH BEHAVIORAL CHARACTERISTICS", which was filed on Mar. 4, 2010, and is incorporated by reference herein.

BACKGROUND OF THE INVENTION

1. Field of the Invention

The present invention relates to logic simulation and in particular to an integrated logic simulator including a serial simulation engine and a concurrent simulation engine.

2. Related Art

Logic simulation is an essential step in the design flow of electronic circuits. Logic simulation is usually performed with Electronic Design Automation (EDA) software tools referred to as logic simulators, which process hardware designs typically provided in the form of Hardware Description Language (HDL) code. Hardware designers perform extensive logic simulations to verify that a hardware design complies with its specifications, before committing the hardware design to the physical implementation phase that produces the actual electronic circuit. In a typical hardware design flow, a functional verification process is carried out along with the design process in order to minimize the risk of producing a circuit that is not compliant with its specifications. A logic simulation typically generates as its results the waveforms of a set of circuit signals the user is interested in observing. The user can analyze and visualize the generated waveforms to verify that the hardware design operates correctly. Logic simulators also support simulating hardware designs with embedded assertions, which use the values of the circuit signals to detect conditions resulting in circuit malfunctioning. A logic simulator evaluates such assertions while simulating the circuit, and reports their violations to the user. Based on these violation reports, the user can uncover and fix design errors in the hardware design.

SUMMARY OF THE INVENTION

A method of simulating a design specified through a hardware description language (HDL) is provided. In this method, an integrated logic simulator can be run. This integrated logic simulator can include a serial simulation engine and a concurrent simulation engine. The serial simulation engine can perform one simulation at a time, whereas the concurrent simulation engine can perform multiple, concurrent simulations. Using a computer, simulations of the serial simulation engine and the concurrent simulation engine can be synchronized based on the classes of events defined by an execution model of the HDL.

The design can be partitioned into two groups of modules executed by the integrated logic simulator. A first group of modules can execute on the serial simulation engine, and a second group of modules can execute on the concurrent simulation engine. In one embodiment, the partitioning is done based upon the capabilities of the serial simulation engine and/or capabilities of the concurrent simulation engine to achieve a desirable level of simulation performance. In another embodiment, the partitioning can be done manually by a user.

Either the serial simulation engine or the concurrent simulation engine can be designated a primary simulation engine of the integrated logic simulator, wherein the other simulation engine is then designated a secondary simulation engine. In one embodiment, the serial simulation engine is the primary simulation engine and the concurrent simulation engine is the secondary simulation engine. In another embodiment, the concurrent simulation engine is the primary simulation engine and the serial simulation engine is the secondary simulation engine. The primary simulation engine invokes the secondary simulation engine at synchronization points. In one embodiment, the synchronization points are before queue evaluations as defined by the execution model of the HDL. In another embodiment, the synchronization points are after queue evaluations as defined by the execution model of the HDL.

Note that partitioning of the design can be done with the design hierarchy taken into account. For example, in one embodiment, a first module being simulated by the secondary simulation engine implies that all sub-modules instantiated deeper within the design hierarchy under the first module are also simulated by the secondary simulation engine. In another embodiment, if the first module (simulated by the secondary simulation engine) instantiates a second module, then the second module can be simulated by the primary simulation engine.

In accordance with the method, certain variables in the secondary simulation engine modules can be identified as interface variables for communicating with the primary simulation engine. Values of these interface variables can be stored in both the serial simulation engine and the concurrent simulation engine.

The interface variable values can be transferred to the secondary simulation engine prior to evaluating events in the secondary simulation engine at the synchronization points. During this transfer, the interface variable values can be translated from a primary simulation engine storage representation to a secondary simulation engine storage representation. In one embodiment, only changed interface variable values are transferred at the synchronization points.

The interface variable values can also be transferred to the primary simulation engine after evaluating events in the secondary simulation engine at the synchronization points. During this transfer, the interface variable values can be translated from the secondary simulation engine storage representation to the primary simulation engine storage representation. In one embodiment, only changed interface variable values are transferred at the synchronization points.

Note that synchronization points in the execution model can be established through an industry standard application programming interface. Exemplary industry standard application programming interfaces include, but are not limited to, the Programming Language Interface (PLI) and the Verification Procedural Interface (VPI). In another embodiment, the synchronization points can be established through proprietary interfaces.

Notably, the secondary simulation engine module can be represented by a stub module in the primary simulation engine. This stub module includes the interface variables for a corresponding secondary simulation engine module. The stub module does not include a HDL of the corresponding secondary simulation engine module.

Another method of simulating a design described in HDL is provided. In this method, modules of the design can be partitioned into first modules for simulation by a serial simulation engine and second modules for simulation by a concurrent simulation engine. The first and second modules can be prioritized for simulation based on classes of events consistent with an execution model of the HDL. Using a computer, simulation of the serial simulation engine and the concurrent simulation engine can be synchronized for each class of events.

Synchronizing can include transferring updated interface variable values, which are shared by the second modules and at least a subset of the first modules, between the serial simulation engine and the concurrent simulation engine. This transferring can include translating representations of the updated interface variable values.

Each second module can be represented as a stub module in the serial simulation engine, wherein the stub module is one of the first modules. Values for an interface variable in the concurrent simulation engine can be stored in a word, wherein these values are associated with multiple instances of that stub module in the serial simulation engine.

Synchronizing can further include finishing the evaluation of one class of events in the serial simulation engine, and then transferring the updated interface variable values to the concurrent simulation engine for evaluation of that same class of events. Synchronizing can yet further include finishing the evaluation of the one class of events in the concurrent simulation engine, and then transferring the updated interface variable values to the serial simulation engine for evaluation of (1) that same class of events when new events in that class were generated by the concurrent simulation engine or (2) a next class of events, if present, in accordance with the execution model of the HDL.

In one embodiment, the HDL is Verilog and the one class of events is one of active events, inactive events, and non-blocking assignment update events. In one embodiment, synchronizing can includes progressing through all classes of events using the serial simulation engine and the concurrent simulation engine based on priorities of the classes of events specified by the HDL.

BRIEF DESCRIPTION OF THE DRAWINGS

FIGS. 3A and 3B illustrate exemplary HDL for a conventional top module and a top module including a stub module, respectively.

DETAILED DESCRIPTION OF THE DRAWINGS

Figure 1:
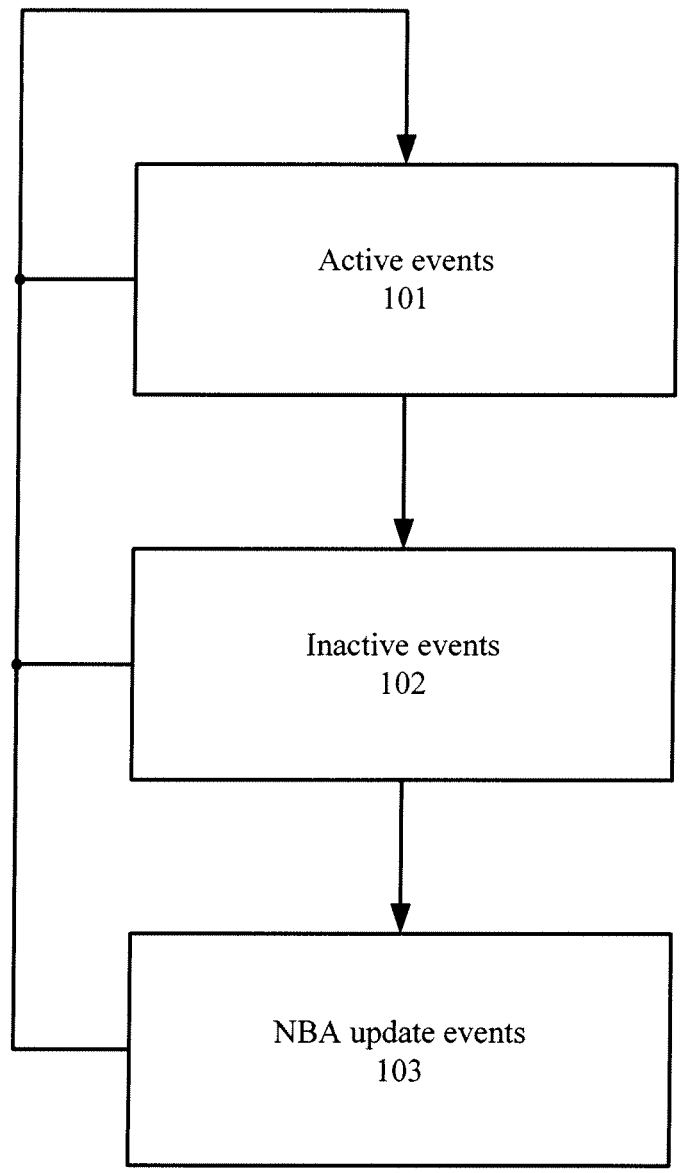
FIG. 1 shows a subset of the queue evaluations in the Verilog HDL execution model.

A conventional logic simulator executes one simulation at a time in a technique referred to herein as a "serial simulation engine". In order to achieve adequate performance, a serial simulation engine is designed to execute each simulation as quickly as possible. Pending U.S. patent application Ser. No. 12/586,724, entitled "Concurrent Simulation Of Hardware Designs With Behavioral Characteristics", filed on Sep. 24, 2009, and incorporated by reference herein, describes a technique for efficiently performing concurrent simulations of a hardware design, herein referred to as a "concurrent simulation engine". Concurrent simulation engines achieve performance by executing several simulations at once.

Depending on the implementations of the serial and concurrent simulation engines as well as the particular characteristics of the hardware design being simulated, it may be desirable to execute certain parts of the hardware design using a serial simulation engine and certain other parts of the hardware design using a concurrent simulation engine. A software-based technique for integrating a concurrent simulation engine and a serial simulation engine into a single integrated logic simulator is described below. A logic simulator resulting from this integration is hereafter referred to as an "integrated logic simulator".

Note that logic simulators implement a particular execution model, as dictated by the Hardware Description Language (HDL). For purposes of describing the integrated logic simulator, the Verilog HDL will be used. However, the integrated logic simulator can be applied to other HDLs and the execution models associated with those HDLs.

The Verilog HDL is interpreted according to an underlying discrete event execution model. Several event queues are defined from which events execute. Events are (1) generated as the simulation progresses, (2) placed on a particular queue, (3) removed from the queue at a particular point in time during the simulation as dictated by the execution model, and (4) executed. Executing events, in turn, may generate additional events that are placed on a queue for later execution. This sequence involving events continues until no more events are generated, at which point the simulation terminates.

Typically, a hardware design to be simulated is expressed as multiple modules in the Verilog HDL. Often there is a correspondence between Verilog modules and actual hardware subcomponents, but this does not necessarily need to be the case (e.g. a Verilog module may represent abstract functionality or behavior that is not implemented by a single hardware subcomponent). Verilog modules are arranged in a hierarchy, with an instance of a module said to be "embedded" in another module. For example, a module for a microprocessor might be decomposed into various arithmetic modules, logic modules, control modules, and storage modules. Within the microprocessor module, there are embedded instances of each constituent module organized in a hierarchy.

Each instantiated Verilog module generates events for execution by the logic simulator according to the specification of the Verilog HDL execution model. Verilog HDL logic simulators should adhere to the execution model, whether they are implemented using only a serial simulation engine, only a concurrent simulation engine, or a combination of a serial simulation engine and a concurrent simulation engine (the latter being the integrated logic simulator described herein).

For example, FIG. 1 shows a subset of the queues specified by the Verilog HDL execution model. The Verilog HDL execution model requires that all active events 101 from the active event queue of the logic simulator be executed before any inactive events 102 from the inactive event queue of the logic simulator are executed. Once the active and inactive event queues are exhausted, then non-blocking assignment (NBA) update events 103 from the NBA update event queue are executed. Note that there are other queues in the Verilog HDL execution model beyond those shown in FIG. 1 with established rules for advancing from one queue to another as the simulation progresses.

In an integrated logic simulator using both a serial simulation engine and a concurrent simulation engine, the HDL program describing the hardware design can be partitioned into two groups of modules. One group of modules is executed by a serial simulation engine and another group of modules is executed by a concurrent simulation engine. Advancing from one queue to another queue in the integrated logic simulator must be coordinated across the serial simulation engine and the concurrent simulation engine, so that the integrated logic simulator does not violate the Verilog HDL execution model (e.g. that NBA update events are not executed while there are still active events and inactive events to execute in either the serial simulation engine or the concurrent simulation engine).

Verilog modules interact with each other through input/output port variables. A Verilog module can also read and write directly to internal variables in other module instances through a facility known as cross-module references (the mechanics of which are known to those skilled in the art and therefore are not described herein). These internal variables, which are used in inter-module interactions, can be identified and are referred to as "interface variables" for a module.

Figure 2:
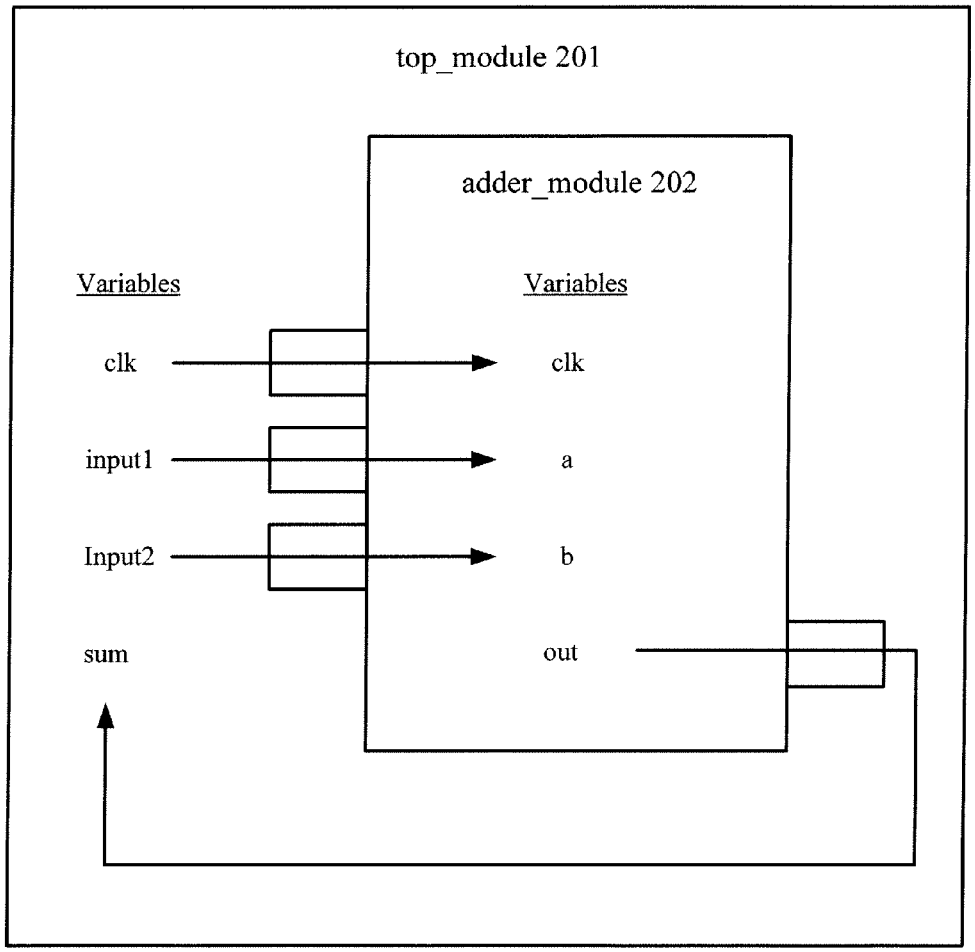
FIG. 2 illustrates the port variables of an embedded module acting as interface variables for the module.

FIG. 2 shows a simple conventional design with two modules: an adder module 202 and a top-level module 201 that instantiates adder module 202. Connections between the variables in top-level module 201 and variables in the embedded adder module 202 are made through the adder port variables. These port variables are the interface variables in this design. As shown in FIG. 2, the interface variables "clk", "input1", and "input2" for top module 201 map into the interface variables "clk", "a", and "b" for adder module 202. Thus, for example, when variable input1 changes, variable "a" also changes. Similarly, the interface variable "out" of adder module 202 maps into the interface variable "sum" for top-level module 201.

Notably, when a module assigned to the serial simulation engine interfaces with a module assigned to the concurrent simulation engine, the serial simulation engine module can interact with a stub module that serves as a placeholder for the concurrent simulation engine module. This stub module can contain all the interface variables of the embedded module. Referring back to the design shown in FIG. 2, the top-level module can be assigned to the serial simulation engine and the adder module can be assigned to the concurrent simulation engine. In this case, instead of seeing the adder module RTL, the serial simulation sees a stub module for the adder.

FIG. 3A illustrates a conventional HDL 300 for design 200 (FIG. 2), whereas FIG. 3B illustrates an HDL 310 seen by the serial simulation engine when simulated with an integrated logic simulator. Note that the interface variables for the adder module remain in HDL 310 (also called the stub module), but the functional aspects of the adder module (i.e. "always @ (posedge_clk)" and "out=a+b") are no longer present in the serial simulation engine. Notably, as described in reference to FIGS. 4A and 4B, the functional aspects of the adder module are instead defined in the concurrent simulation engine.

Figures 4A, 4B:
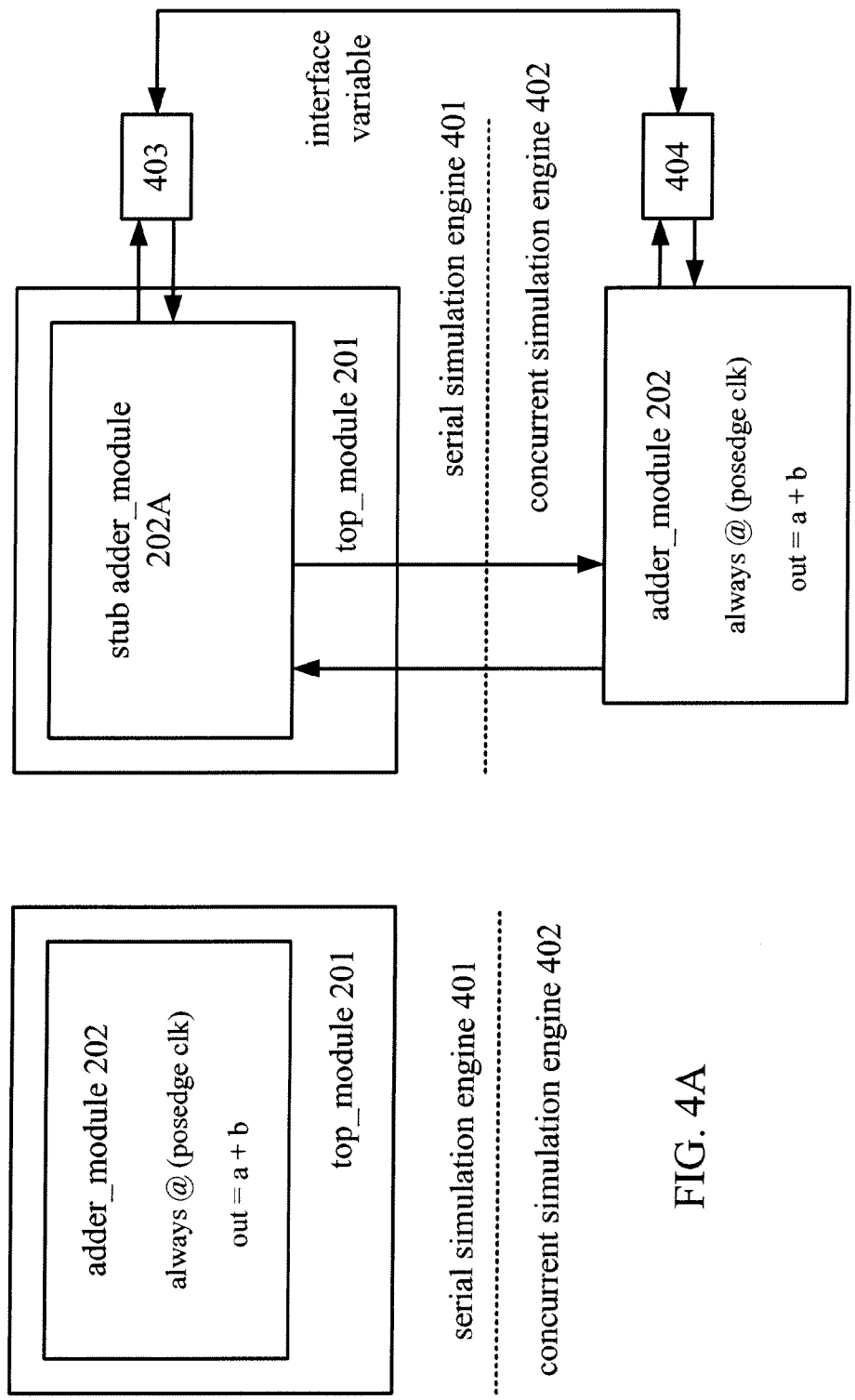
FIGS. 4A and 4B illustrate block diagrams of the conventional top module and the top module including a stub module, respectively.

FIGS. 4A and 4B illustrate exemplary partitioning of a top module and an embedded module. Specifically, FIG. 4A illustrates a conventional logic simulator view of the design shown in FIG. 2. In this case, all modules (i.e. top module 201 and adder module 202) are simulated by serial simulation engine 401. In contrast, FIG. 4B illustrates the partitioning when concurrent simulation engine 402 is made responsible for the embedded adder module 202. In this case, the actual adder module HDL can be simulated by concurrent simulation engine 402 and serial simulation engine 401 can interact with a stub module 202A for the embedded adder module.

In the configuration shown in FIG. 4B, serial simulation engine 401 can have its own storage 403 allocated for each interface variable (one shown). Values can be written into the interface variables that act as inputs to stub module 202A, and values are read from the interface variables that act as outputs to stub module 202A. Likewise, concurrent simulation engine 402 can have its own storage 404 allocated for each interface variable (one shown). Values can be read from the interface variables that act as inputs to the concurrent simulation engine module, i.e. adder module 202, and values can be written into the interface variables that act as outputs to adder module 202. As indicated above, value changes of the interface variables in adder module 202 will be reflected in stub module 202A, thereby ensuring proper functioning of top module 201. Similarly, value changes of the interface variable in stub module 202A will be reflected in adder module 202 to ensure its proper functioning.

Note that variables that are not interface variables are stored in either serial simulation engine 401 or concurrent simulation engine 402, but not both. In other words, the shared state between serial simulation engine 401 and concurrent simulation engine 402 in the integrated logic simulator is limited to interface variables.

Figure 5B:
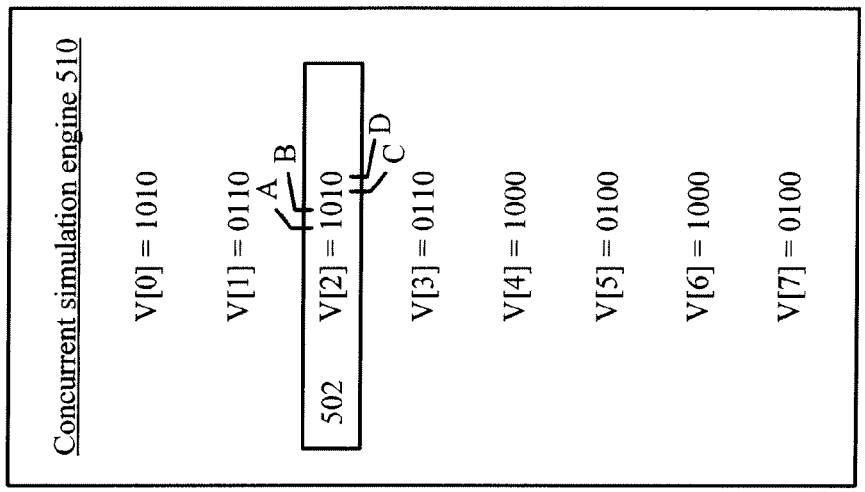
FIGS. 5A and 5B illustrate exemplary storage representations for interface variable values in a serial simulation engine and a concurrent simulation engine, respectively.
Figure 5A:
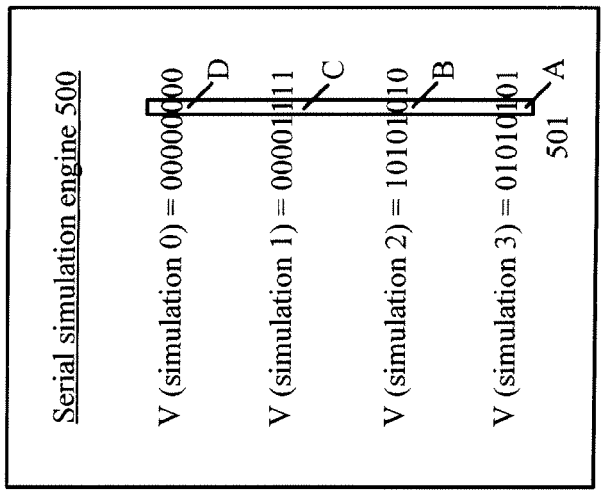

Notably, the serial simulation engine and the concurrent simulation engine can utilize different representations for storing variable values. In one embodiment, the serial simulation engine can use a representation in which multiple values for the variable are stored, one for each simulation. For example, referring to a serial simulation engine 500 shown in FIG. 5A, consider a variable value representation for an eight-bit variable V that has values for four different simulations: simulation 0, simulation 1, simulation 2, and simulation 3. Each simulation for variable V stores eight bits. In contrast, referring to a concurrent simulation engine 510 shown in FIG. 5B, the values of the four simulations are stored in multiple four-bit words. Specifically, there are eight such words allocated, one for each bit in the variable V (i.e. V[0]-V[7]). Boxes 501 and 502 in FIGS. 5A and 5B, respectively, illustrate how values for a single bit across multiple simulations are organized in serial simulation engine 500 and concurrent simulation engine 510 (see, e.g. bits A, B, C, and D).

Because there are two copies of the interface variables, i.e. one in the serial simulation engine and one in the concurrent simulation engine, these two copies must remain synchronized when updated so that the integrated logic simulator keeps a consistent view of the entire simulation state. In some embodiments, interface variable values are synchronized at the beginning and at the end of queue evaluations. Synchronizing the interface variable values requires translating between the serial simulation engine representation (see, e.g. FIG. 5A) and the concurrent simulation engine representation (see, e.g. FIG. 5B) for storing variable values.

Figure 6A:
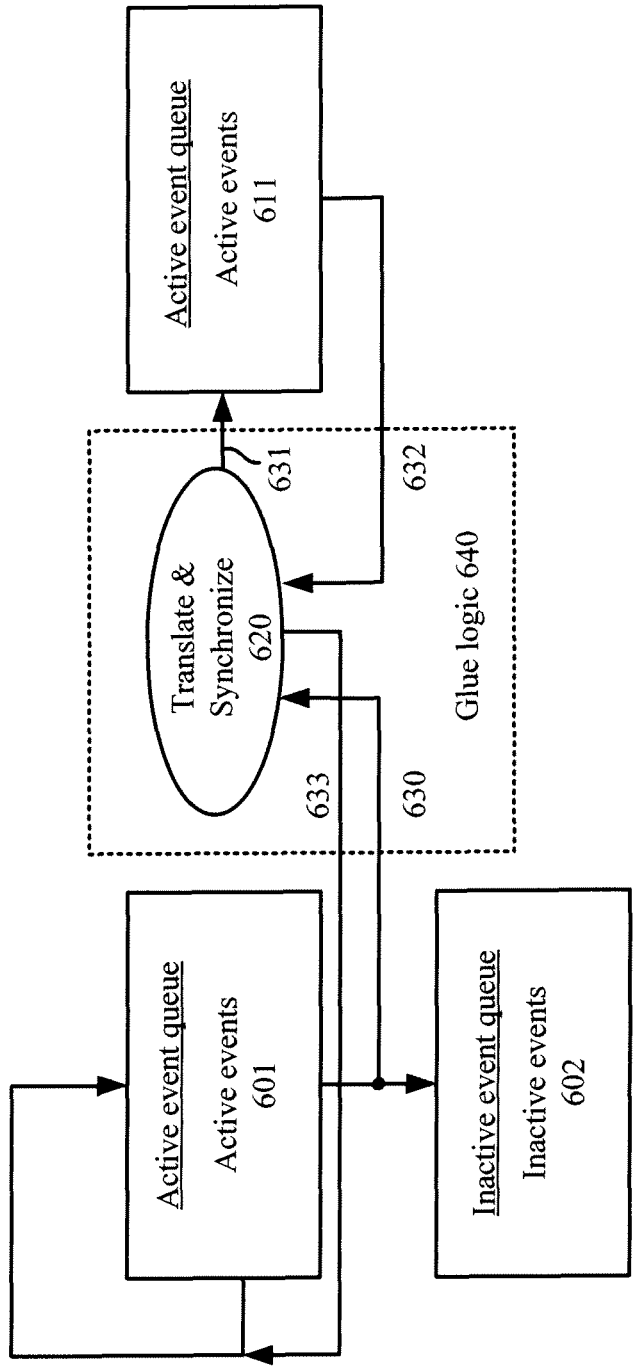
FIG. 6A illustrates exemplary actions for translating and synchronizing between a serial simulation engine and a concurrent simulation engine for an active event queue evaluation.

FIG. 6A illustrates an exemplary synchronizing between a serial simulation engine 600A and a concurrent simulation engine 600B based on an active event queue in a Verilog HDL execution model. Note that each simulation engine has its own active event queue. That is, serial simulation engine 600A has active events 601 and concurrent simulation engine has active events 611. In one embodiment, when there are no more active events 601 in the active event queue in serial simulation engine 600A, it is time to synchronize with concurrent simulation engine 600B.

In step 630, the port interface variable values for the concurrent simulation engine module are transferred from serial simulation engine 600A to translate and synchronize function 620. This translate and synchronize function 620 includes translating from the storage representation used by serial simulation engine 600A to that used by concurrent simulation engine 600B (e.g. from the storage representation shown in FIG. 5A to that shown in FIG. 5B). In step 631, active events 611 are executed in concurrent simulation engine 600B based on the translated, transferred port interface variable values. In step 632, the port interface variable values for the concurrent simulation engine module are transferred to serial simulation engine 600A via translate and synchronize function 620. In this direction, translate and synchronize function 620 includes a translation from the storage representation used by concurrent simulation engine 600B to that used by serial simulation engine 600A.

Note that translate and synchronize function 620 forms part of glue logic 640. This glue logic provides both compile time functions and runtime functions. The compile time functions include ensuring that when serial simulation engine 600A is given a source code for all modules, the concurrent simulation engine 600B is provided the definitions of modules assigned to it, while the serial simulation engine 600A is provided stub definitions for the same modules. The runtime functions include ensuring that once the simulator begins to run and generate events, a translation of the interface variables between the serial and concurrent simulation engines is provided. The runtime functions also include ensuring the proper synchronizing of simulations in both serial simulation engine 600A and concurrent simulation engine 600B, so that execution of the queues in serial simulation engine 600A conforms to Verilog HDL execution model. Thus, translate and synchronize function 620 forms part of the runtime functions of glue logic 640.

Note that executing active events 611 in concurrent simulation engine 600B may have generated additional active events 601 in serial simulation engine 600A, which is indicated by step 633 (synchronized using translate and synchronize function 620). These new events are then executed per the Verilog HDL execution model, and then steps 630, 631, 632, and 633 are repeated using translate and synchronize function 620. When there are no active events 601 in serial simulation engine 600A (based on additional active events generated by concurrent simulation engine 600B or active events already queued in serial simulation engine 600A), then inactive events 602 from the inactive event queue of serial simulation engine 600A can be executed according to the Verilog HDL execution model.

Figure 6B:
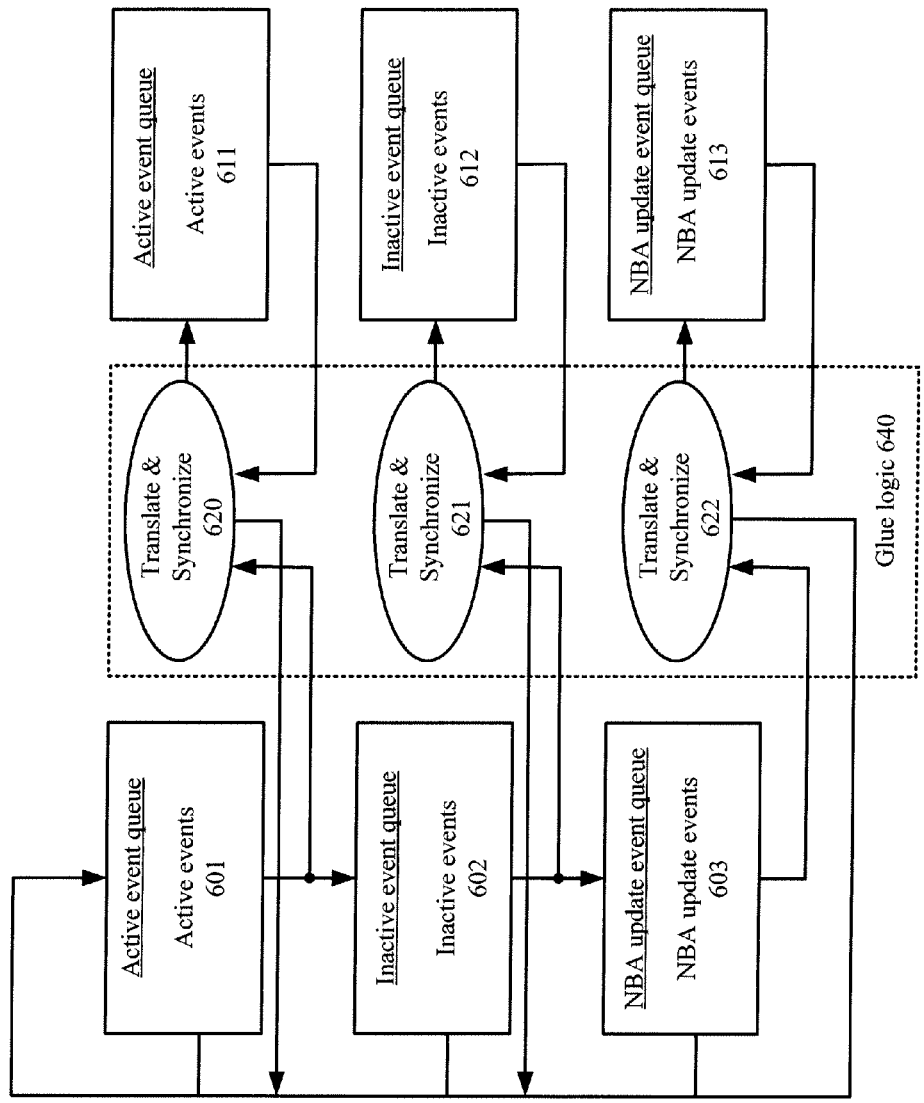
FIG. 6B illustrates exemplary actions for translating and synchronizing between a serial simulation engine and a concurrent simulation engine for multiple event queue evaluations, the event queues based on queue types specified by the Verilog HDL execution model.

The synchronization described in reference to the active queue in FIG. 6A can be extended to other queue evaluations in the Verilog HDL execution model. For example, FIG. 6B illustrates an exemplary extension including the active event queues (active events 601 and 611), the inactive event queues (inactive events 602 and 612), and the NBA update event queues (NBA update events 603 and 613) for serial simulation engine 600A and concurrent simulation engine 600B. The active, inactive, and NBA update queues between serial simulation engine 600A and concurrent simulation engine 600B are synchronized using translate and synchronize functions 620, 621, and 622, respectively (which form part of glue logic 640).

After a queue is evaluated in serial simulation engine 600A, the interface variable values are transferred to concurrent simulation engine 600B. The events are then executed from the corresponding queue in concurrent simulation engine 600B. The interface variable values containing the results of the event executions are then transferred back to serial simulation engine 600A, which in turn progresses from queue to queue according to the Verilog HDL execution model. Note that, as indicated in FIG. 6B, any event executed in either serial simulation engine 600A of concurrent simulation engine 600B may generate one or more events of either higher or lower priority. In general, the translate and synchronize function is notified whenever any new event is generated by concurrent simulation engine 600B, wherein that new event is then placed in the appropriate queue of serial simulation engine 600A.

Note that exemplary queues based on the Verilog HDL are described above, including active events, inactive events, and NBA update events. However, an integrated logic simulator can advantageously apply to other HDLs and the execution models associated with those HDLs. Therefore, in general, the integrated logic simulator can work with all classes of events provided by a specific HDL. Moreover, each specific HDL can have different queue transition rules, which can be honored by the integrated logic simulator.

Figure 6C:
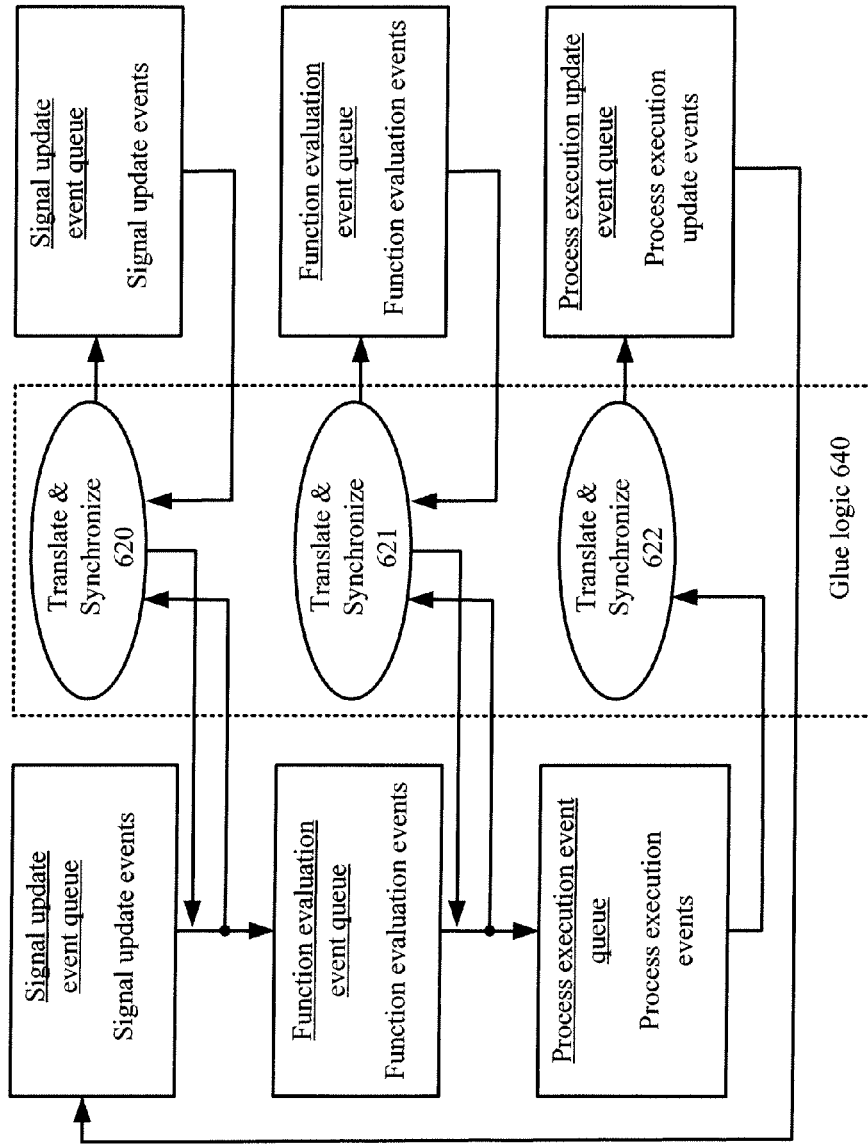
FIG. 6C illustrates exemplary actions for translating and synchronizing between a serial simulation engine and a concurrent simulation engine for multiple event queue evaluations, the event queues based on queue types specified by the VHDL execution model.

For example, FIG. 6C illustrates the simulation execution order of exemplary queues in a VHDL (very high speed integrated circuit (VHSIC) HDL) model. Note that in the VHDL model, the order of execution progresses through signal update events, function evaluation events, and process evaluation events with control also flowing in this direction until reaching the end of process execution, at which point control returns to signal update. As described above, each execution transition between serial simulation engine 600A and concurrent simulation engine 600B can be facilitated using glue logic 640, which includes translate and synchronize functions 620, 621, and 622.

Consider an example below in which related active events and NBA update events are executed in an integrated logic simulator. These events come from three assignments (wherein a Verilog assignment includes writing a computed, variable value to a memory location): two assignments in a module simulated by the serial simulation engine and one assignment from a module simulated by the concurrent simulation engine:

Serial Simulation Engine

```
// Active event.
always @(posedge CLK)
A = B + 1;
//      NBA update event.
always @(posedge CLK)
C <= D;
```

Concurrent Simulation Engine

```
// Active event.
always @(A)
B = A + 2;
```

In the above example, when a CLK triggers at a positive edge, two events are generated. One event is placed in the serial simulation engine active event queue and another event is placed in the serial simulation engine NBA update event queue. In accordance with the priority sequence described for FIG. 6B, the active event executes first according to the Verilog HDL execution model, after which the serial simulation active event queue is empty. This empty state causes the integrated logic simulator to synchronize with the concurrent simulation engine according to the four-step process described in reference to FIG. 6A. Specifically, The value for variable A is transferred from the serial simulation engine to the concurrent simulation engine.

Active events are executed in the concurrent simulation engine.

The updated value for variable B is transferred from the concurrent simulation engine to the serial simulation engine.

Because of active events executed in the concurrent simulation, there may be additional work to do (i.e. new active events) in the serial simulation engine before progressing to the next queue evaluation. Therefore, the process returns to the active event queue in the serial simulation engine.

At this point, there are no more active events in the serial simulation engine to execute. Moreover, there are no inactive events, either in the serial simulation engine or in the concurrent simulation engine (the latter point being determined after synchronizing with the concurrent simulation engine on the inactive event queue in a manner outlined in FIG. 6A), meaning that the serial simulation can execute the pending NBA update event, which writes to variable C.

In one embodiment, only the modified interface variables (or, alternatively, only the modified bits in the interface variables) are synchronized at queue evaluation points in order to reduce the amount of work that needs to be done. In other embodiments, only the simulations with modified interface variables are synchronized at queue evaluation points. A queue evaluation point can occur when all events in a specific queue in one simulation engine have been finished. In one embodiment, a queue evaluation point can trigger synchronization, i.e. the glue logic transferring any updated interface variables to the corresponding queue for execution in the other simulation engine. However, in other embodiments, a change in one or more interface variables can trigger synchronization. Thus, synchronization can occur (in whole or in part) before queue evaluations, after queue evaluations, or both before and after queue evaluations.

Figure 7:
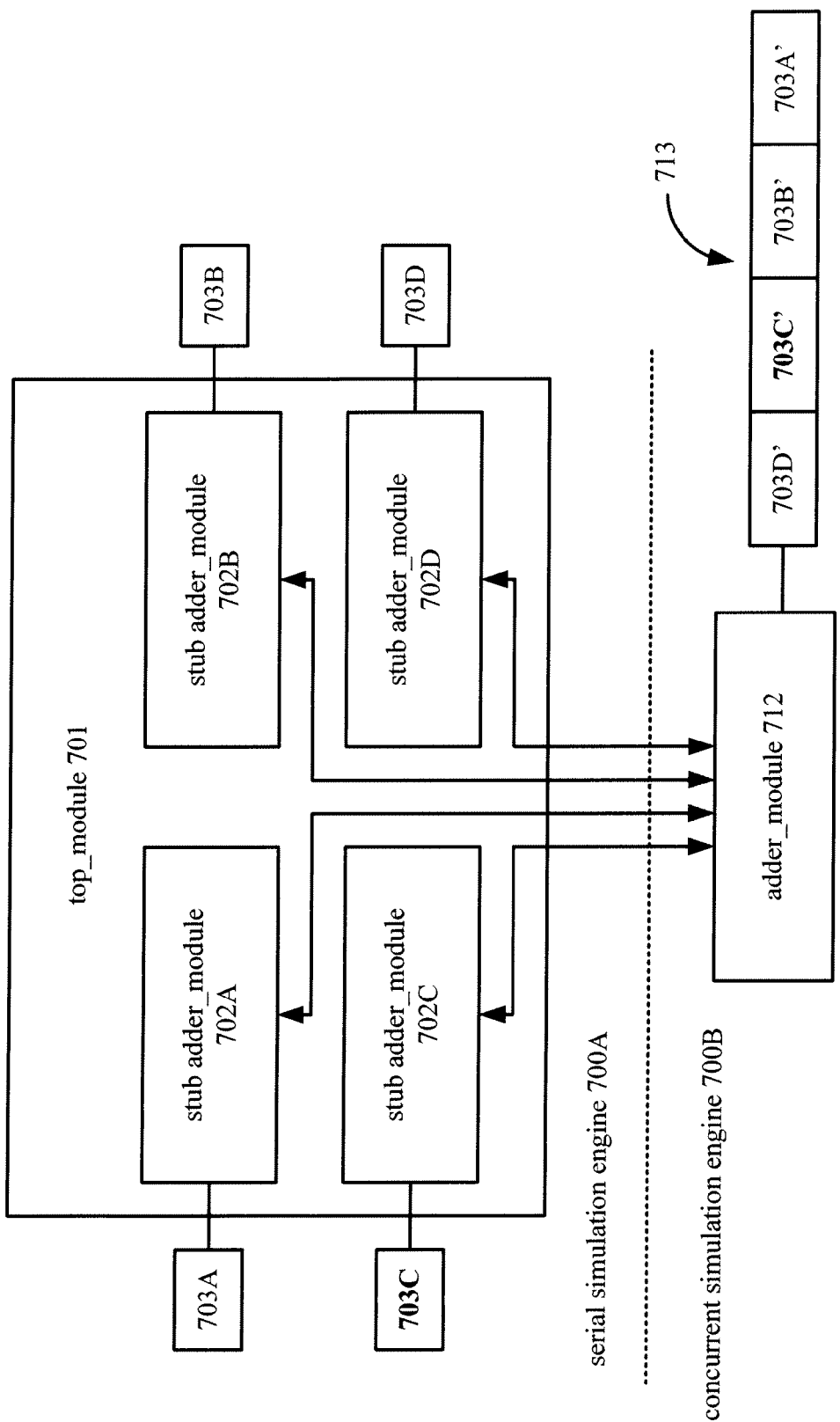
FIG. 7 illustrates data storage for the serial simulation engine and the concurrent simulation engine. Notably, the word storage for the concurrent simulation engine allows one executed instruction to simulate multiple logic functions and generate multiple outputs corresponding to the multiple logical instances in the serial simulation engine.

FIG. 7 illustrates a top module 701, which is simulated by a serial simulation engine 700A, and an adder module 712, which is simulated by a concurrent simulation engine 700B.

In this embodiment, top module 701 includes multiple stub adder modules 702A, 702B, 702C, and 702D. Notably, all instances of stub adder modules 702A-702D in serial simulation engine 700A can be defined by only one instance of adder module 712 in concurrent simulation engine 700B.

Advantageously, this aspect provides significant leverage for the integrated logic simulator. Specifically, each stub module in serial simulator engine 700A can have separate storage for each interface variable, whereas the corresponding module in concurrent simulation engine 700B can have one word capable of storing multiple values, thereby allowing that word to store the interface variable values associated with multiple stub modules. For example, in FIG. 7, stub adder modules 702A-702D can have storage 703A-703D, respectively, for each interface variable. In contrast, adder module 712 in concurrent simulation engine 700B needs only one word 713 to store those interface variables from each of stub adder modules 702A-702D.

Assuming the values stored in storage 703A-703D are one-bit values (e.g. a clk value), then each bit of word 713 can correspond to a value stored by a specific stub module (i.e. 703A⇆703A', 703B⇆703B', 703C⇆703C', 703D⇆703D'). Thus, if the interface variable value in storage 703C in the serial simulation engine 700A has changed during execution of an event, then that value will be transferred to bit 703C' in the concurrent simulation engine 700B during synchronization. Note that this transfer includes the same translation described in reference to FIGS. 5A and 5B. Further note that other embodiments may have multi-bit values stored in serial simulation engine 700A, which can be transferred as multi-bit values to positions of one word of concurrent simulation engine 700B. This storage configuration allows concurrent simulation engine 700B to perform multiple (i.e. 4) concurrent simulations with multiple (i.e. 4) values in adder module 712.

Advantageously, many computers used for logic simulation have extended word values, e.g. registers of 32, 64, or 128 bits. Thus, the concurrent simulation engine of an integrated logic simulator can concurrently apply the same operation to a considerable amount of data stored in one word.

In the above-described embodiment, the serial simulation engine can be the primary simulation engine of the integrated logic simulator, in the sense that it is the serial simulation engine that invokes the concurrent simulation engine at the synchronization points. In other embodiment, the reverse configuration is also possible, i.e. in which the concurrent simulation engine is the primary simulation engine, advancing from queue to queue according to the Verilog HDL execution model and invoking the serial simulation engine at the appropriate synchronization points. In one embodiment, the synchronization points in the execution model can be established through an industry standard application programming interface, such as the Programming Language Interface (PLI) or the Verification Procedural Interface (VPI), which are used to implement user-defined extensions to the Verilog simulation. In another embodiment, the synchronization points in the execution model can be established through one or more proprietary interfaces.

In one embodiment, the partitioning of the design to determine which modules can be instantiated as stub modules (and with associated concurrent simulation performed in the concurrent simulation engine) can be performed manually by a user. In another embodiment, this partitioning can be performed automatically by the simulation tool based on the number of potential instances (i.e. the greater the number of instances, the greater the leverage achievable by the concurrent simulation engine). In yet another embodiment, partitioning can be done based upon the capabilities of the serial simulation engine and/or capabilities of the concurrent simulation engine to achieve a desirable level of simulation performance. For example, if a module makes extensive calls to user-defined C functions through a PLI (Programming Language Interface), then that module may be better suited for execution by a serial simulation engine because the user-defined function was mostly likely written without the ability to take advantage of the value representation of the concurrent simulation engine.

Note that partitioning of the design can be done with the design hierarchy taken into account. For example, in one embodiment, a first module being simulated by the secondary simulation engine implies that all sub-modules instantiated deeper within the design hierarchy under the first module are also simulated by the secondary simulation engine. In another embodiment, if the first module (simulated by the secondary simulation engine) instantiates a second module, then the second module can be simulated by the primary simulation engine. As noted above, the primary simulation engine can be the serial simulation engine and the second simulation engine can be the concurrent simulation engine (and vice versa).

For example, the following code provides an exemplary case of the flexibility inherent in the integrated logic simulator.

```
// Original Verilog
module top_module;
    reg clk;
    reg [7:0] input1;
    reg [7:0] input2;
    wire [7:0] sum;
    wire [7:0] product;
    adder_and_mult am(.clk(clk),
            .a(input1),
            .b(input2),
            .sum(sum),
            .product(product));
endmodule
module adder_and_mult(clk, a, b, sum, product);
    input clk;
    input [7:0] a;
    input [7:0] b;
    output [7:0] sum;
    output [7:0] product;
    always @(posedge clk)
        sum = a + b;
    multiplier mult(.clk(clk),
            .a(a),
            .b(b),
            .product(product));
endmodule
module multiplier(clk, a, b, product);
    input clk;
    input [7:0] a;
    input [7:0] b;
    output [7:0] product;
    always @(posedge clk)
        product = a * b;
endmodule
// Verilog + stub modules simulated by the serial simulation
engine.
// To be simulated by the serial simulation engine.
module top_module;
    reg clk;
    reg [7:0] input1;
    reg [7:0] input2;
    wire [7:0] sum;
    wire [7:0] product;
    adder_and_mult am(.clk(clk),
            .a(input1),
            .b(input2),
            .sum(sum),
            .product(product));
endmodule
// To be simulated by the concurrent simulation engine.
module adder_and_mult(clk, a, b, sum, product);
    input clk;
    input [7:0] a;
    input [7:0] b;
    output [7:0] sum;
    output [7:0] product;
    multiplier mult(.clk(clk),
            .a(a),
            .b(b),
            .product(product));
endmodule
// To be simulated by the serial simulation engine.
module multiplier(clk, a, b, product);
    input clk;
    input [7:0] a;
    input [7:0] b;
    output [7:0] product;
    always @(posedge clk)
        product = a * b;
endmodule
```

Figure 8:
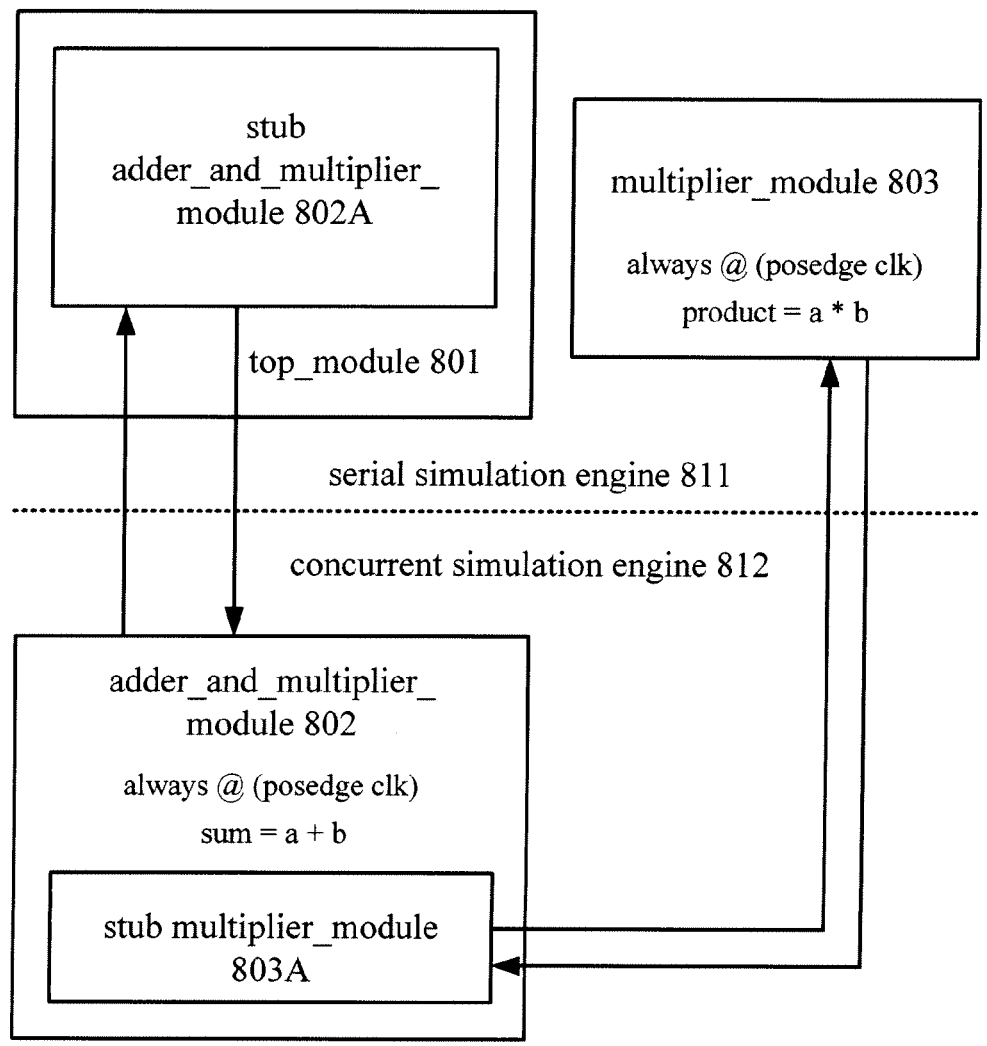
FIG. 8 illustrates a block diagram of various modules as implemented by serial and concurrent simulation engines. Notably, a module in the serial simulation engine includes a stub module that transfers responsibility to the concurrent simulation engine, whereas a module in the concurrent simulation engine includes a stub module that transfers responsibility to the serial simulation engine.

Note that FIG. 8 illustrates a block diagram representing the above code. In this embodiment, serial simulation engine 811 is made responsible for a top module 801, which includes stub adder and multiplier module 802A. A concurrent simulation engine 812 is made responsible for an embedded adder and multiplier module 802. In this case, the actual adder HDL can be simulated by concurrent simulation engine 802 and concurrent simulation engine 812 can interact with stub module 803A for the embedded multiplier module. In this embodiment, adder and multiplier module 802 includes a stub multiplier module 803A, which interacts with multiplier module 803 in serial simulation engine 811. In other words, any sub-modules (any module directed to perform the simulation from a stub module) instantiated deeper within a design hierarchy under a module can be structured to be done by either serial simulation engine 811 or concurrent simulation engine 812. Note that in general, this transfer of simulation responsibility between serial simulation engine 811 and concurrent simulation engine 812 can be performed any number of times and can be structured to optimize system resources.

Note that although the concurrent simulation engine has been described above as executing events for an adder module, which is embedded in the top module, an integrated logic simulation is equally applicable to other types of top/embedded modules. For example, another embedded module can include a device under test (DUT), which can be represented in the serial simulation engine as a stub module. In this case, the top module can include a test bench.

Figure 9:
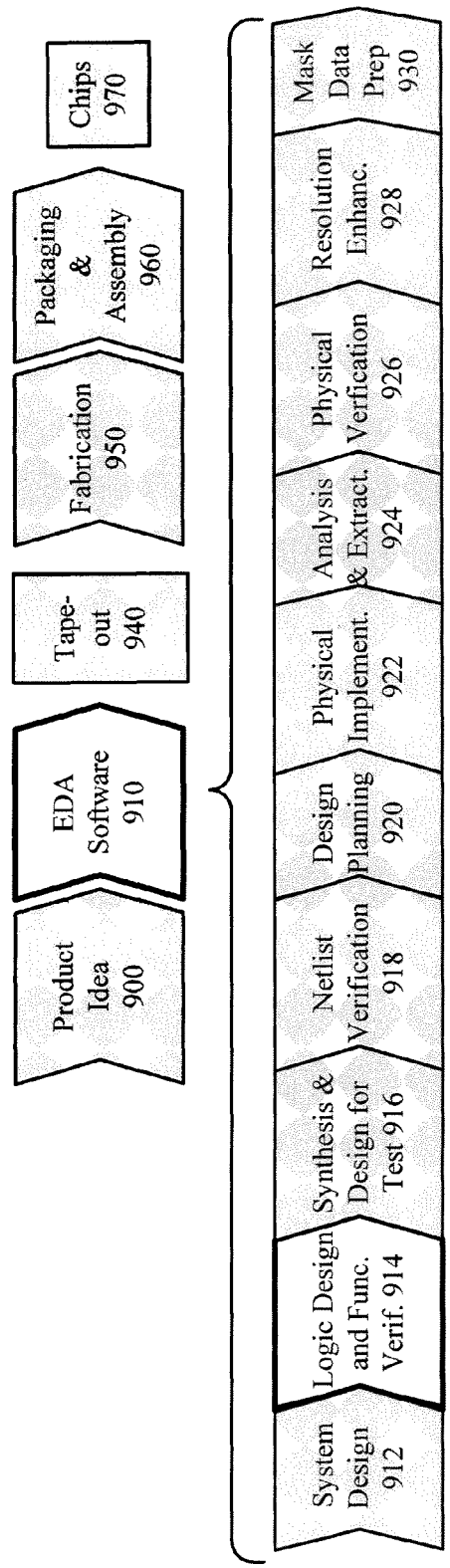
FIG. 9 illustrates a simplified representation of an exemplary digital ASIC design flow including an integrated logic simulator.

FIG. 9 shows a simplified representation of an exemplary digital ASIC design flow including an integrated logic simulator. At a high level, the process starts with the product idea (step 900) and is realized in an EDA software design process (step 910). When the design is finalized, it can be taped-out (event 940). After tape out, the fabrication process (step 950) and packaging and assembly processes (step 960) occur resulting, ultimately, in finished chips (result 970).

The EDA software design process (step 910) is actually composed of a number of steps 912-930, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 910) will now be provided:

System design (step 912): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 914): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products. In one embodiment, the above-described integrated logic simulator can be implemented during logic design and functional verification step 914.

Synthesis and design for test (step 916): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, DFTMAX, TetraMAX, and DesignWare® products.

Netlist verification (step 918): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 920): Here, an overall floorplan for the chip is constructed and analyzed for timing and top-level routing. Exemplary EDA software products from Synopsys, Inc. that can be used at this step include Astro and IC Compiler products.

Physical implementation (step 922): The placement (positioning of circuit elements) and routing (connection of the same) occurs at this step. Exemplary EDA software products from Synopsys, Inc. that can be used at this step include the Astro and IC Compiler products.

Analysis and extraction (step 924): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 926): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 928): This step involves geometric manipulations of the layout to improve manufacturability of the design. Exemplary EDA software products from Synopsys, Inc. that can be used at this step include Proteus, ProteusAF, and PSMGen products.

Mask data preparation (step 930): This step provides the "tape-out" data for production of masks for lithographic use to produce finished chips. Exemplary EDA software products from Synopsys, Inc. that can be used at this step include the CATS(R) family of products.

The integrated logic simulator described above can be run using one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method of simulating a design specified through a hardware description language (HDL), the method comprising:

running an integrated logic simulator, the integrated logic simulator including a serial simulation engine and a concurrent simulation engine, each of the serial simulation engine and the concurrent simulation engine for performing logic simulations;

partitioning the design into two groups of modules executed by the integrated logic simulator, the two groups including a first group of modules for evaluation on the serial simulation engine and a second group of modules for evaluation on the concurrent simulation engine;

performing simulation using the serial simulation engine, which performs one simulation at a time;

performing simulation using the concurrent simulation engine, which performs multiple, concurrent simulations; and using a computer, synchronizing simulations of the serial simulation engine and the concurrent simulation engine based on classes of events defined by an execution model of the HDL.

2. The method of claim 1, wherein the partitioning is done based upon at least one of capabilities of the serial simulation engine and capabilities of the concurrent simulation engine to achieve at least a predetermined level of simulation performance.

3. The method of claim 1, wherein the partitioning is performed with a design hierarchy of the design taken into account.

4. The method of claim 3, wherein when a first module is simulated by the concurrent simulation engine, then any sub-module instantiated deeper within the design hierarchy under the first module is also simulated by the concurrent simulation engine.

5. The method of claim 3, wherein when a first module simulated by a first simulation engine instantiates a second module, then the second module is simulated by a second simulation engine, wherein the second module instantiates a third module simulated by the first simulation engine, and wherein the first and second simulation engines are one of (1) the serial and concurrent simulation engines, respectively, and (2) the concurrent and serial simulation engines, respectively.

6. The method of claim 1, further including designating one of the serial simulation engine and the concurrent simulation engine a primary simulation engine of the integrated logic simulator, and designating the other simulation engine a secondary simulation engine of the integrated logic simulator, wherein the primary simulation engine invokes the secondary simulation engine at synchronization points.

7. The method of claim 6, wherein the serial simulation engine is the primary simulation engine and the concurrent simulation engine is the secondary simulation engine.

8. The method of claim 6, wherein the concurrent simulation engine is the primary simulation engine and the serial simulation engine is the secondary simulation engine.

9. The method of claim 6, wherein the synchronization points are before queue evaluations as defined by the execution model of the HDL.

10. The method of claim 6, wherein the synchronization points are after queue evaluations as defined by the execution model of the HDL.

11. The method of claim 6, further including identifying certain variables in secondary simulation engine modules as interface variables for communicating with the primary simulation engine.

12. The method of claim 11, further including storing values of the interface variables in the serial simulation engine and the concurrent simulation engine.

13. The method of claim 11, further including transferring interface variable values to the secondary simulation engine prior to evaluating events in the secondary simulation engine at the synchronization points.

14. The method of claim 13, further including translating the interface variable values from a primary simulation engine storage representation to a secondary simulation engine storage representation.

15. The method of claim 11, further including transferring interface variable values to the primary simulation engine after evaluating events in the secondary simulation engine at the synchronization points.

16. The method of claim 15, further including translating the interface variable values from a secondary simulation engine storage representation to a primary simulation engine storage representation.

17. The method of claim 6, wherein the synchronization points in the execution model are established through an industry standard application programming interface.

18. The method of claim 17, wherein the industry standard application programming interface is one of Programming Language Interface (PLI) and Verification Procedural Interface (VPI).

19. The method of claim 13, wherein a secondary simulation engine module is represented by a stub module in the primary simulation engine.

20. The method of claim 19, wherein the stub module includes the interface variables for a corresponding secondary simulation engine module.

21. The method of claim 19, wherein the stub module does not include a HDL of a corresponding secondary simulation engine module.

22. A method of performing simulation of a design described in a hardware description language (HDL), the method comprising:
partitioning modules of the design, the modules being partitioned into first modules for simulation by a serial simulation engine and second modules for simulation by a concurrent simulation engine, and the first and second modules being prioritized for simulation based on classes of events consistent with an execution model of the HDL, each of the serial simulation engine and the concurrent simulation engine for performing logic simulations; and
using a computer, synchronizing simulations of the serial simulation engine and the concurrent simulation engine for each class of events.

23. The method of claim 22, wherein said synchronizing simulations includes transferring updated interface variable values, which are shared by the second modules and at least a subset of the first modules, between the serial simulation engine and the concurrent simulation engine.

24. The method of claim 23, wherein said transferring includes translating representations of the updated interface variable values.

25. The method of claim 24, wherein each second module is represented as a stub module in the serial simulation engine, the stub module being one of the first modules, and wherein values for an interface variable in the concurrent simulation engine are stored in a word, the values being associated with multiple instances of the stub module in the serial simulation engine.

26. The method of claim 23, wherein said synchronizing simulations includes finishing evaluation of one class of events in the serial simulation engine, then transferring the updated interface variable values to the concurrent simulation engine for evaluation of the one class of events.

27. The method of claim 26, wherein said synchronizing simulations further includes finishing evaluation of the one class of events in the concurrent simulation engine, then transferring the updated interface variable values to the serial simulation engine for evaluation of one of the one class of events when new events in the one class of events were generated by the concurrent simulation engine and a next class of events, if present, in accordance with the execution model of the HDL.

28. The method of claim 27, wherein the HDL is Verilog and the one class of events is one of active events, inactive events, and non-blocking assignment update events.

29. The method of claim 27, wherein the HDL is very high speed integrated circuit HDL (VHDL) and the one class of events is one of signal update events, function evaluation events, and process execution events.

30. The method of claim 27, wherein said synchronizing simulations further includes progressing through all classes of events using the serial simulation engine and the concurrent simulation engine based on priorities of the classes of events specified by the HDL.

31. The method of claim 22, wherein the partitioning is done based on at least one of capabilities of the serial simulation engine and capabilities of the concurrent simulation engine.

32. A computer-readable medium storing computer-executable instructions for simulating a design specified through a hardware description language (HDL), the computer-readable medium being non-transitory, the instructions when executed by a computer performing steps comprising:
running an integrated logic simulator, the integrated logic simulator including a serial simulation engine and a concurrent simulation engine, each of the serial simulation engine and the concurrent simulation engine for performing logic simulations;
partitioning the design into two groups of modules executed by the integrated logic simulator, the two groups including a first group of modules for evaluation on the serial simulation engine and a second group of modules for evaluation on the concurrent simulation engine;
performing simulation using the serial simulation engine, which performs one simulation at a time;
performing simulation using the concurrent simulation engine, which performs multiple, concurrent simulations; and
synchronizing simulations of the serial simulation engine and the concurrent simulation engine based on classes of events defined by an execution model of the HDL.

33. The computer-readable medium of claim 32, wherein the partitioning is done based upon at least one of capabilities of the serial simulation engine and capabilities of the concurrent simulation engine to achieve at least a predetermined level of simulation performance.

34. The computer-readable medium of claim 32, wherein the partitioning is performed with a design hierarchy of the design taken into account.

35. The computer-readable medium of claim 34, wherein when a first module is simulated by the concurrent simulation engine, then any sub-module instantiated deeper within the design hierarchy under the first module is also simulated by the concurrent simulation engine.

36. The computer-readable medium of claim 34, wherein when a first module simulated by a first simulation engine instantiates a second module, then the second module is simulated by a second simulation engine, wherein the second module instantiates a third module simulated by the first simulation engine, and wherein the first and second simulation engines are one of (1) the serial and concurrent simulation engines, respectively, and (2) the concurrent and serial simulation engines, respectively.

37. The computer-readable medium of claim 32, further including designating one of the serial simulation engine and the concurrent simulation engine a primary simulation engine of the integrated logic simulator, and designating the other simulation engine a secondary simulation engine of the integrated logic simulator, wherein the primary simulation engine invokes the secondary simulation engine at synchronization points.

38. The computer-readable medium of claim 37, wherein the serial simulation engine is the primary simulation engine and the concurrent simulation engine is the secondary simulation engine.

39. The computer-readable medium of claim 37, wherein the concurrent simulation engine is the primary simulation engine and the serial simulation engine is the secondary simulation engine.

40. The computer-readable medium of claim 37, wherein the synchronization points are before queue evaluations as defined by the execution model of the HDL.

41. The computer-readable medium of claim 37, wherein the synchronization points are after queue evaluations as defined by the execution model of the HDL.

42. The computer-readable medium of claim 37, further including identifying certain variables in secondary simulation engine modules as interface variables for communicating with the primary simulation engine.

43. The computer-readable medium of claim 37, wherein the synchronization points in the execution model are established through an industry standard application programming interface.

44. A computer-readable medium storing computer-executable instructions for performing a simulation of a design described in a hardware description language (HDL), the computer-readable medium being non-transitory, the instructions when executed by a computer performing steps comprising:
partitioning modules of the design, the modules being partitioned into first modules for simulation by a serial simulation engine and second modules for simulation by a concurrent simulation engine, and the first and second modules being prioritized for simulation based on classes of events consistent with an execution model of the HDL, each of the serial simulation engine and the concurrent simulation engine for performing logic simulations; and
using a computer, synchronizing simulations of the serial simulation engine and the concurrent simulation engine for each class of events.

45. The computer-readable medium of claim 44, wherein said synchronizing simulations includes transferring updated interface variable values, which are shared by the second modules and at least a subset of the first modules, between the serial simulation engine and the concurrent simulation engine.

46. The computer-readable medium of claim 45, wherein said transferring includes translating representations of the updated interface variable values.

47. The computer-readable medium of claim 45, wherein said synchronizing simulations includes finishing evaluation of one class of events in the serial simulation engine, then transferring the updated interface variable values to the concurrent simulation engine for evaluation of the one class of events.

48. The computer-readable medium of claim 44, wherein the partitioning is done based on at least one of capabilities of the serial simulation engine and capabilities of the concurrent simulation engine.

* * * * *